United States Patent [19]

Lee

[11] Patent Number: 5,196,926

[45] Date of Patent: Mar. 23, 1993

[54] OPTICAL SYSTEM FOR AN LCD PROJECTOR

[75] Inventor: Seung G. Lee, Seoul, Rep. of Korea

[73] Assignee: Goldstar Co., Ltd., Seoul, Rep. of Korea

[21] Appl. No.: 699,500

[22] Filed: May 14, 1991

[30] Foreign Application Priority Data

May 19, 1990 [KR] Rep. of Korea ................. 7186/1990

[51] Int. Cl.[5] .............................................. H04N 9/31
[52] U.S. Cl. ...................................... 358/60; 353/122
[58] Field of Search ......................... 358/60, 231, 236; 353/122

[56] References Cited

U.S. PATENT DOCUMENTS 5,060,058 10/1991 Goldenberg et al. ................. 358/60

FOREIGN PATENT DOCUMENTS

| 0258927 | 8/1987 | European Pat. Off. . |
| 0303898 | 2/1989 | European Pat. Off. . |
| 338810 | 10/1989 | European Pat. Off. . |
| 0287034 | 3/1990 | European Pat. Off. . |
| 409246 | 1/1991 | European Pat. Off. . |
| 63-216026 | 9/1988 | Japan . |

*Primary Examiner*—James J. Groody
*Assistant Examiner*—Mark R. Powell
*Attorney, Agent, or Firm*—Birch, Stewart, Kolasch & Birch

[57] ABSTRACT

An optical system for an LCD projector comprising an illuminating device, an infrared filter, an optical system and a projecting lens comprises a 45° horizontally inclined blue light tranmission filter, a 45° horizontally inclined green light reflection mirror, a 45° horizontally inclined red image reflection mirror, a 45° horizontally inclined blue image transmission filter, three total reflection mirrors, three condensing lenses, three LCD panels, and separates red, green and blue light elements from the light having been transmitted through the infrared filter, then reemerging an image in respective colors by using the separated red, green and blue light elements in order to compose the reemerged image. The projector lens projects the composed image from the optical system on a screen as an enlarged image and the LCD projector according to this invention can provide a compensation of the red light radiation by red optical path considerably longer than those of the green and the blue optical paths, a considerably high luminance due to using the metal halide lamp, low manufacturing cost, an image of a good resolution power because of reducing the vignetting, also a compactness of its projection lens.

2 Claims, 2 Drawing Sheets

OPTICAL SYSTEM FOR AN LCD PROJECTOR

BACKGROUND OF THE INVENTION

The present invention relates to LCD projectors, more particularly to an optical system for an LCD projector, comprising 3 LCD panels capable of separating red, green and blue light elements of light emitted by a light source thereof, and then composing them.

A known optical system of the LCD (Liquid Crystal Display) projector of the type to which this invention pertains is shown by way of example in FIG. 1. It comprises an illuminating device 21 including a high luminance halogen lamp as a light source, an infrared filter 22 positioned on a first optical path from the halogen lamp of the illuminating device 21 and adapted for filtering out infrared rays from the light emitted by the halogen lamp. Also, the conventional LCD projector is provided with a 45° inclined blue light reflection mirror 23 positioned on the first optical path from the halogen lamp in a distance after the infrared filter 22, and adapted for separating blue light element from the light being transmitted through the infrared filter 22 and for reflecting the blue light element along a first B optical path perpendicular to the first optical path. There is also a first 45° inclined total reflection mirror 31 positioned on the first B optical path in order to totally reflect the B light element reflected by the B light refection mirror 23 to a second blue optical path perpendicular to the first blue optical path, or parallel with the first optical path. On the other hand, a light transmitted through the B light reflection mirror 23 is filtered by a 45° inclined green light reflection mirror 24 positioned on the first optical path after the B light reflection mirror 23, and the green light element is therefrom filtered out. Thereafter, the G light element is reflected along a first green optical path perpendicular to the first optical path. In result, only red light element is transmitted through the G light reflection mirror 24, then reflected by a second 45° inclined total reflection mirror 25 positioned on the first optical path after the green light reflection mirror 24. The red light element reflected along a first red optical path perpendicular to the first optical path, or parallel with the first B and G optical paths, reaches a third 45° total reflection mirror 26 which totally reflects the red light element to a second red optical path perpendicular to the first R optical path. Also, the blue, green and red light elements, respectively reflected by the first total mirror 31, the G reflection mirror 24 and the third total reflection mirror 26, are respectively transmitted through three LCD panels 30, 29 and 28 in which an image reemerges in respective colors. Thereafter, the reemerging image is applied to a dichroic prism 27 in which the blue and red color images are reflected in 90° reflection angle, and the green color image is transmitted, thereby causing the three color images to be composed into a desired color image. The composed color image from the prism is projected on a screen as an enlarged image by a projection lens 32.

However, there have been some problem in the above-mentioned conventional LCD projector, such as the low grade of luminance because of using the halogen lamp for a light source, and the more intense radiation of the R light element than those of other light elements. Therefore, the length of the optical path of the R light element is longer than those of the other optical paths as shown in FIG. 1 in order to compensate for the intense radiation of the R light element. But this compensation has not been sufficient and thus the projected image on the screen is almost seen in red, thereby causing the image of high resolution power to be unobtainable. On the other hand, it is difficult to manufacture the dichroic prism used in the conventional LCD projector and furthermore, the dichroic prism is a high cost, heavy and fragile element.

SUMMARY OF THE INVENTION

Accordingly, it is an object of the present invention to provide a an optical system for LCD projector which can provide high luminance and high resolution color image, whereby the above-mentioned problems encountered in the conventional LCD projector can be solved.

In accordance with the present invention, the above-mentioned object can be accomplished by providing a LCD projector comprising an illuminating device having a light source, an infrared filter positioned on an original optical path from the light source and adapted for filtering out infrared rays from the light emitted by the light source, an optical system for sequentially separating red, green and blue light elements from the light transmitted through the infrared filter and then reemerging an image in respective colors by means of the separated R, G and B light elements in order to compose the reemerged image, a projection lens projecting the composed image on a screen as an enlarged image. In this LCD projector according to the present invention, the optical comprises a 45° inclined blue light transmission filter positioned on the original optical path in a distance after the infrared filter and adapted for transmitting blue light element of the light from the infrared filter, and simultaneously reflecting R and G light elements along a first R and G optical path perpendicular to the original optical path; a first condensing lens positioned on the original optical path in a distance after the B light transmission filter in order to condense the blue light element; a first LCD panel positioned on the original optical path closely after the first condensing lens in order to reemerge blue color image upon receiving the blue light element condensed by the first condensing lens, a first 45° inclined total reflection mirror positioned on a first B image path, parallel with the original optical path, after the first LCD panel in order to reflect the B color image along a second B image path perpendicular to the first B image path; a 45° inclined green reflection mirror positioned on the R and G optical path in order to transmit the R light element and to reflect the G light element along a first G optical path perpendicular to the R and G optical path, or parallel with the original optical path; a second condensing lens positioned on the first green optical path and adapted for condensing the green light element; a second LCD panel positioned on the first G optical path in a distance after the second condensing lens in order to reemerge green color image upon receiving the G light element condensed by the second condensing lens; a second 45° inclined total reflection mirror positioned on a first red optical path of the R light element transmitted through the 45° inclined G reflection mirror, and adapted for reflecting the R light element along a second R optical path perpendicular to the first R optical path; a third 45° inclined total reflection mirror positioned on the second R optical path in order to reflect the R light element along a third R optical path perpendicular to the second R optical path; a third condensing lens positioned on the third R optical path in a distance after the third reflection mirror and adapted for condensing the R light element; a third LCD panel positioned on the third R optical path closely after the third condensing lens in order to reemerge R color image upon receiving the R light element condensed by the third condensing lens; a 45° inclined R color image reflection mirror positioned at the cross of a first G and a first R image paths in order to transmit the G color image and to reflect the R color image along a second R image path perpendicular to the first R image path, or parallel to the first G image path; and a 45° inclined B color image transmission filter positioned at the cross of the first G, the second B and the second R image paths in order to transmit the B color image and to reflect the G and R color images along a second G and a third R image paths, respectively, and perpendicular to the first G image path, or parallel to the second B image path, which causes the R, G and B color images to be composed.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE INVENTION

Figure 1:
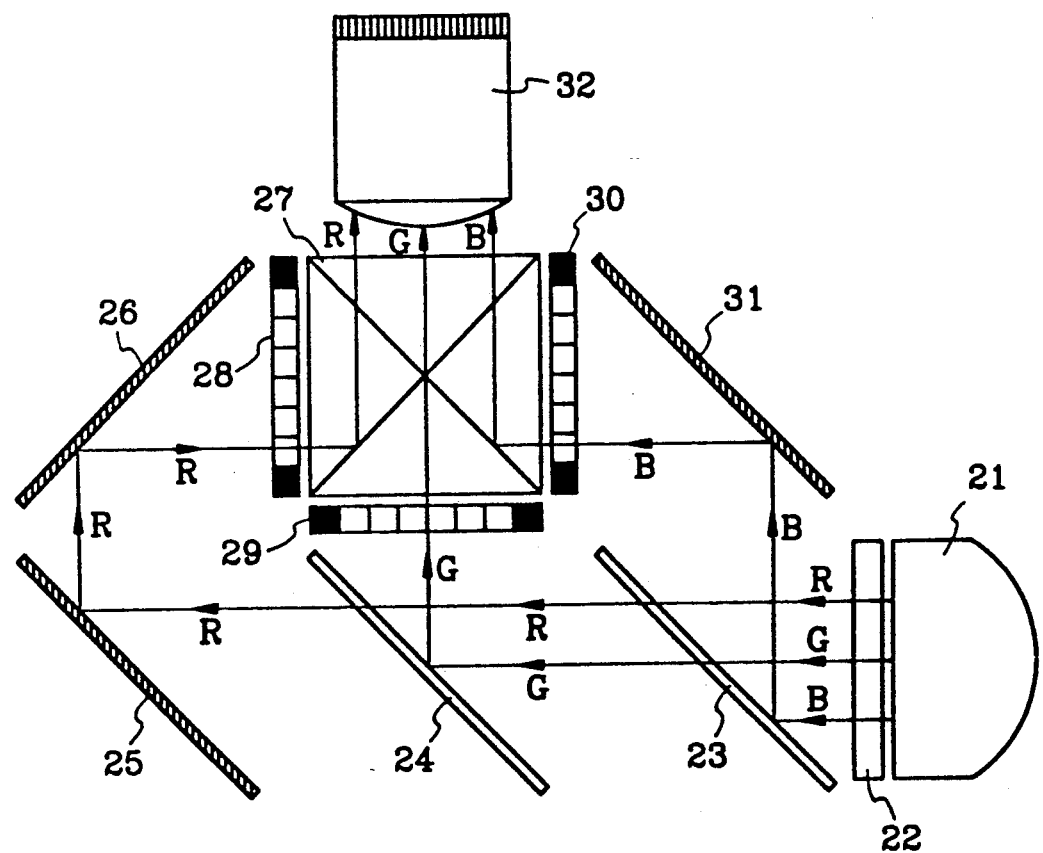
FIG. 1 is a schematic view showing a conventional LCD projector with an optical system according to the prior art.
Figure 2:
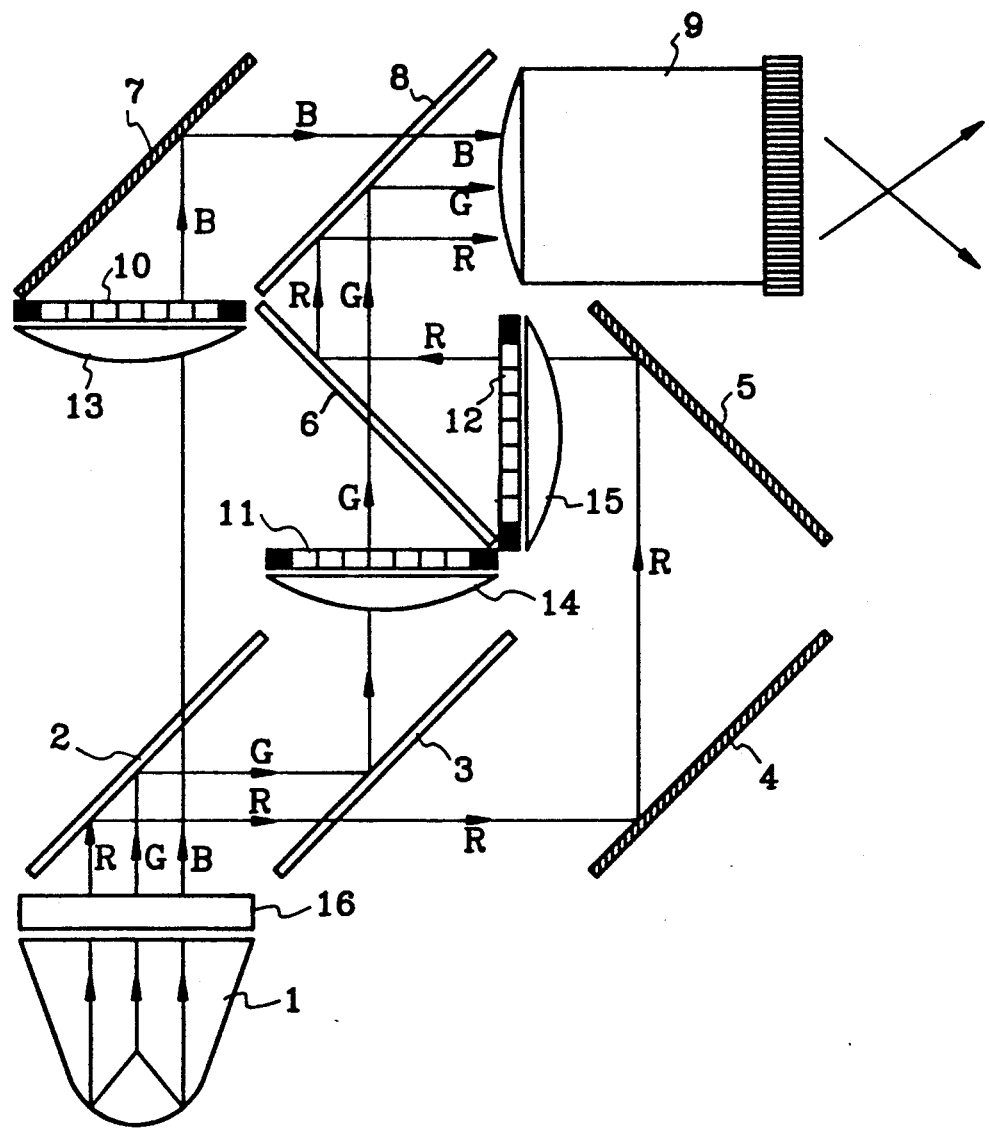
FIG. 2 is a view corresponding to FIG. 1, but showing the present invention.

An optical system for an LCD projector embodying the present invention is schematically shown in FIG. 2. It comprises a high luminance illuminating device 1 comprising a metal halide lamp for a light source, an infrared filter 16 positioned on the original optical path of the light emitted by the metal halide lamp of the illuminating device 1 and adapted for filtering out the infrared rays from the light. In comparison with the halogen lamp used in the above-mentioned conventional LCD the radiation of the red light element of the light emitted by the metal halide lamp used in this LCD projector is not seriously intense. Also, the light having the infrared rays filtered out by the infrared filter 16 is separated into R, G and B light elements, then reemerged an image in respective colors by using the separated R, G and B light elements in order to compose the reemerged image by the optical system in accordance with this invention. Thereafter, the composed color image from the optical system is projected on a screen (not shown) as an enlarged image by a projection lens 9.

Also, the optical system is provided with a 45° inclined B light transmission filter 2 positioned on the original optical path from the illuminating device 1 in a distance after the infrared filter 16, and adapted for transmitting B light element of the light having been transmitted through the infrared filter 16, simultaneously reflecting R and G light elements along a first R and G optical path, perpendicular to the original optical path. A first condensing lens 13 is positioned on the original optical path in order to condense the B light element transmitted through the B light transmission filter 2. Also, a first LCD panel 10 which is adapted for reemerging a B color image upon receiving the condensed B light element from the first condensing lens 13 is positioned on the original optical path closely after the first condensing lens 13. Also, there is provided a first 45° inclined total reflection mirror 7 positioned on a first B image path, parallel with the original optical path, in a distance after the first LCD panel 10 in order to reflect the B color image along a second B image path perpendicular to the first B image path.

On the other hand, there are provided a 45° inclined G reflection mirror 3 positioned on the first R and G optical path in order to transmit the R light element and reflect the G light element along a first G optical path perpendicular to the first R and G optical path, and a second condensing lens 14 positioned on the first G optical path and adapted for condensing the G light element. Also, on the first G optical path after the second condensing lens 14, there is a second LCD panel 11 for reemerging a G color image upon receiving the condensed G light element from the second condensing lens 14.

As shown in FIG. 2, the LCD projector according to this invention is provided with a second 45° inclined total reflection mirror 4 positioned on a first R optical path of the R light element transmitted through the 45° inclined G reflection mirror 3, and adapted for reflecting the R light element along a second R optical path perpendicular to the first R optical path, or parallel with the original optical path and the first G optical path. Also, a third 45° inclined total reflection mirror 5 is positioned on the second R optical path for reflecting the R light element, radiated from the second total reflection mirror 4, to a third condensing lens 15 along a third R optical path perpendicular to the second R optical path. The third condensing lens 15 is adapted for condensing the R light element. Also, a third LCD panel 12 is positioned on the third R optical path closely after the third condensing lens 15, which panel 12 is adapted for reemerging a R color image upon receiving the condensed R light element from the third condensing lens 15.

On the other hand, the first R color image path from the third LCD panel 12 crosses perpendicularly with a first G color image path from the second LCD panel 11 at a cross. At the cross, a 45° inclined R color image reflection mirror 6 is positioned in order to transmit the G color image and reflect the R color image along a second R color image path perpendicular to the first R color image path, or parallel with the first G color image path. Also, the first G and the second R color image paths from the R color image reflection mirror 6 crosses perpendicularly with the second B image path from the first total reflection mirror 7 at a cross. There is a 45° inclined B color image transmission filter 8 at the cross of the first G, the second B and the second R color image paths. By the B color image transmission filter 8, the B color image is transmitted, and the G and R color images are reflected to a projection lens 9, which is positioned on the second B image path in a distance after the B color image transmission filter 8, along a second G and a third R color image paths respectively perpendicular to the first G image path, or parallel with the second B image path. Therefore, the R, G and B color images are composed by the B color image transmission filter 8, thereby to be a desired color image. Thereafter, the composed color image is received by the projection lens 9, then projected on a screen as an enlarged image.

In the LCD projector in accordance with this invention, the radiation of the R light element emitted by the metal halide lamp is slightly stronger than those of the G and B light elements, but the slight strength of the R light radiation can be completely compensated by its optical path considerably longer than those of the G and the B optical paths as shown in FIG. 2. In result, the LCD projector according to this invention can provide a considerably high luminance due to using the metal halide lamp, low manufacturing cost because the dichroic prism, which must have been used in the conventional LCD projector, is not used. Furthermore, this LCD projector can provide a good resolution image because of reducing the vignetting, also a compactness of its projection lens.

Although the preferred embodiment of the invention has been disclosed for illustrative purpose, those skilled in the art will appreciate that various modifications, additions and substitutions are possible, without departing from the scope and spirit of the invention as disclosed in the accompanying claims.

What is claimed is:

1. An optical system for an LCD projector comprising an illuminating means having a light source, an infrared filter positioned on an original optical path from the light source and adapted for filtering out infrared rays from the light emitted by the light source, an optical system for separating red, green and blue light elements from the light transmitted through the infrared filter and then for reemerging an image in respective colors by using the separated red, green and blue light elements to compose a reemerged image, and a projection lens projecting an enlarged composed image, wherein said optical system further comprises:

a 45° horizontally inclined blue light transmission means positioned after said infrared filter on the original optical path from the light source, said means is adapted for transmitting blue light element of said light transmitted through said infrared filter and simultaneously reflecting red and green light elements along a red and green optical path perpendicular to said original optical path;

a first condensing means positioned on said original optical path, and adapted for condensing said blue light element;

a first LCD panel positioned on said original optical path after said first condensing means, and adapted for reemerging blue color image upon receiving said blue light element condensed by said first condensing means;

a first 45° horizontally inclined total reflection means positioned on a first blue image path after said first LCD panel, and adapted for reflecting said blue color image along a second blue image path perpendicular to said original image path;

a 45° horizontally inclined green light reflection means positioned on said red and green optical path, and adapted for transmitting said red light element and reflecting said green light element along a first green optical path perpendicular to said red and green optical path;

a second condensing means positioned on said first green optical path, and adapted for condensing said green light element;

a second LCD panel positioned on said first green optical path after said condensing means, and adapted for reemerging green color image upon receiving said light element condensed by said second condensing means;

a second 45° horizontally inclined total reflection means positioned on a first red optical path of the red light element transmitted through said 45° horizontally inclined green light reflection mirror, and adapted for reflecting said red light element along a second red optical path perpendicular to said first red optical path;

a third 45° vertically inclined total reflection means positioned on said second red optical path, and adapted for reflecting said red light element along a third red optical path perpendicular to said second red optical path;

a third condensing means positioned on said third red optical path, and adapted for condensing said red light element;

a third LCD panel positioned on said third red optical path after said third condensing means, and adapted for reemerging red color image upon receiving said red light element condensed by said third condensing means;

a 45° vertically inclined red image reflection means positioned at a cross of a first green image path and a first red image path respectively from said second and third LCD panels, and adapted for transmitting said green color image and reflecting said red color image along a second red image path perpendicular to said first red image path; and a 45° horizontally inclined blue image transmission means positioned at a cross of said first green, said second blue and said second red image paths, and adapted for transmitting said blue color image and reflect said green and red color images along an image path perpendicular to said first green image path, thereby causing the red, green and blue color images to be composed.

2. An LCD projector with an optical system as claimed in claim 1, wherein said light source of said illuminating means comprises a metal halide lamp.

* * * * *